United States Patent
Moosvi et al.

(10) Patent No.: US 11,467,616 B2
(45) Date of Patent: Oct. 11, 2022

(54) SYSTEM AND METHOD FOR CONTROLLING OPERATION OF AN ENERGY GENERATION AND STORAGE SYSTEM

(71) Applicant: General Electric Company, Schenectady, NY (US)

(72) Inventors: Alina Fatima Moosvi, Ballston Spa, NY (US); Vaidhya Nath Venkitanarayanan, Schenectady, NY (US); Irene Michelle Berry, Schenectady, NY (US); Patrick Hammel Hart, Ballston Lake, NY (US); Hullas Sehgal, Niskayuna, NY (US); Fernando Javier D'Amato, Niskayuna, NY (US); Charles Joseph Kosuth, Albany, NY (US); Deepak Raj Sagi, Bangalore (IN); Rajni Kant Burra, Clifton Park, NY (US); Megan Ann DeWitt, Boston, MA (US); Enno Ubben, Steinfurt (DE)

(73) Assignee: General Electric Company, Schenectady, NY (US)

( * ) Notice: Subject to any disclaimer, the term of this patent is extended or adjusted under 35 U.S.C. 154(b) by 69 days.

(21) Appl. No.: 16/677,781

(22) Filed: Nov. 8, 2019

(65) Prior Publication Data

US 2020/0150706 A1    May 14, 2020

(30) Foreign Application Priority Data

Nov. 9, 2018    (IN) .............................. 201841042178

(51) Int. Cl.
*G05F 1/66* (2006.01)
*G05B 19/042* (2006.01)
(Continued)

(52) U.S. Cl.
CPC ........... *G05F 1/66* (2013.01); *G05B 19/0428* (2013.01); *G06F 1/263* (2013.01); *H02J 3/28* (2013.01)

(58) Field of Classification Search
CPC ....... G05F 1/66; G05B 19/0428; G06F 1/263; H02J 3/28; H02J 3/32; H02J 3/381;
(Continued)

(56) References Cited

U.S. PATENT DOCUMENTS 7,089,190 B2    8/2006    Tsui
7,873,442 B2    1/2011    Tsui
(Continued)

FOREIGN PATENT DOCUMENTS

CN    103001225 B    10/2014
CN    105608635 A    5/2016
(Continued)

OTHER PUBLICATIONS

C. Deckmyn, T. L. Vandoorn, J. Van de Vyver, J. Desmet and L. Vandevelde, "A Microgrid Multilayer Control Concept for Optimal Power Scheduling and Voltage Control," in IEEE Transactions on Smart Grid, vol. 9, No. 5, pp. 4458-4467, Sep. 2018, doi: 10.1109/TSG.2017.2658865. (Year: 2018).*

(Continued)

*Primary Examiner* — M. N. Von Buhr
(74) *Attorney, Agent, or Firm* — Armstrong Teasdale LLP

(57) ABSTRACT

A method for controlling an energy generation and storage system using a multi-layer architecture is provided. The method includes determining, by one or more control devices, a power or energy generation for the energy generation and storage system at a first layer of the multi-layer architecture. The method includes determining, by the one or more control devices, a power or energy set point for the system at a second layer of the multi-layer architecture. The (Continued)

method includes controlling, by the one or more control devices, the energy generation and storage system based, at least in part, on the power or energy setpoint.

13 Claims, 10 Drawing Sheets

(51) Int. Cl.
*G06F 1/26* (2006.01)
*H02J 3/28* (2006.01)

(58) Field of Classification Search
CPC .... H02J 3/008; H02J 2300/24; H02J 2300/28; H02J 2203/20; G06Q 10/04; G06Q 10/06; G06Q 50/06; Y02E 60/00; Y02E 10/56; Y04S 50/10; Y04S 40/20
See application file for complete search history.

(56) References Cited

U.S. PATENT DOCUMENTS

| | | |
|---|---|---|
| 8,744,641 B2 | 6/2014 | Ito |
| 8,754,547 B2 | 6/2014 | Jin et al. |
| 8,788,110 B2 | 7/2014 | Taima |
| 8,970,160 B2 | 3/2015 | Groves et al. |
| 9,008,849 B2 | 4/2015 | Ozaki et al. |
| 9,098,876 B2 | 8/2015 | Steven et al. |
| 9,774,216 B2* | 9/2017 | Yamane ............ H02J 13/00034 |
| 2008/0046387 A1 | 2/2008 | Gopal et al. |
| 2010/0324962 A1* | 12/2010 | Nesler ................ G06Q 10/0637 705/7.36 |
| 2012/0173034 A1 | 7/2012 | Taima |
| 2012/0323387 A1 | 12/2012 | Ozaki et al. |
| 2013/0024042 A1 | 1/2013 | Asghari et al. |
| 2014/0077599 A1 | 3/2014 | Siegel et al. |
| 2014/0077610 A1 | 3/2014 | Zhang et al. |
| 2014/0136448 A1 | 5/2014 | Takayama et al. |
| 2015/0032661 A1 | 1/2015 | Manfield et al. |
| 2015/0184632 A1* | 7/2015 | Sagi ........................ H02J 3/381 290/44 |
| 2015/0240784 A1* | 8/2015 | Sagi ...................... F03D 7/0284 700/287 |
| 2015/0295402 A1* | 10/2015 | Black ....................... H02J 1/00 700/291 |
| 2016/0049792 A1* | 2/2016 | Burra ...................... F03D 9/257 307/52 |
| 2016/0147204 A1* | 5/2016 | Wichmann ........... G05B 13/042 700/287 |
| 2016/0172899 A1* | 6/2016 | Taniguchi ................. H02J 7/35 320/101 |
| 2016/0364646 A1 | 12/2016 | Fischer |
| 2017/0005515 A1* | 1/2017 | Sanders .................... H02J 3/14 |
| 2017/0082992 A1 | 3/2017 | Riley et al. |
| 2019/0072921 A1* | 3/2019 | Riley .................. G05B 19/042 |

FOREIGN PATENT DOCUMENTS

| | | |
|---|---|---|
| CN | 103544655 B | 2/2017 |
| CN | 106712114 A | 5/2017 |
| CN | 106992556 A | 7/2017 |
| CN | 105375501 B | 7/2018 |
| JP | 2002262458 A | 9/2002 |
| WO | WO2014121794 A1 | 8/2014 |
| WO | WO2014201849 A1 | 12/2014 |

OTHER PUBLICATIONS

Hajizadeh et al., Intelligent power management strategy of hybrid distributed generation system, Science Direct, Electrical Power & Energy Systems, vol. 29, 2007, pp. 783-795.
Marzband et al., Energy Management System of Hybrid Microgrid with Energy Storage, World Energy System Conference—WESC, Jun.-Aug. 2012, pp. 635-642.
Pourmousavi et al., Real-Time Energy Management of a Stand-Alone Hybrid Wind-Microturbine Energy System Using Particle Swarm Optimization, Sustainable Energy, IEEE Transactions, vol. 1, Issue 3, Oct. 2010, pp. 193-201.
Pourmousavi et al., A Framework for Real-Time Power Management of a Grid-Tied Microgrid to Extend Battery Lifetime and Reduce Cost of Energy, IEEE PES Innovative Smart Grid Technologies (ISGT), 2012, pp. 1-8.
Heredia F-Javier et al:"On optimal participation in the electricity markets of wind power plants with battery energy storage systems", Computers and Operations Research Oxford, GB, vol. 96, Mar. 27, 2018 (Mar. 27, 2018), pp. 316-329.
EPO Search Report, dated Dec. 16, 2019.

* cited by examiner

SYSTEM AND METHOD FOR CONTROLLING OPERATION OF AN ENERGY GENERATION AND STORAGE SYSTEM

FIELD

The present subject matter relates generally to energy generation and storage systems and more particularly, to systems and methods for controlling operation of energy generation and storage systems.

BACKGROUND

Power generation facilities can be configured to deliver various grid services for revenue generation. For instance, power generations systems, such as renewable energy plants, can be configured to respond to requests for grid services, such as peak shaving, frequency response, ramp rate control, purchasing and selling of energy, load following, energy arbitrage, and other grid services. Typically, power generation facilities provide grid services in modal fashion such that the power generation facility responds to power demands for a single grid service at a time.

Energy storage systems have become increasingly used to deliver power to utility grids either as part of standalone energy storage systems or as part of a renewable energy farm (e.g., a wind farm or solar farm) with an integrated energy storage system. Energy storage systems can include one or more battery banks or other energy storage devices that can be coupled to the grid via a suitable power converter. Energy storage systems are unique in that energy storage systems have the ability to both deliver and reserve energy for particular grid services.

BRIEF DESCRIPTION OF THE INVENTION

Aspects and advantages of embodiments of the present disclosure will be set forth in part in the following description, or may be learned from the description, or may be learned through practice of the embodiments.

In one aspect, a method for controlling an energy generation and storage system using a multi-layer architecture is provided. The method includes determining, by one or more control devices, a power or energy generation schedule for the energy generation and storage system at a first layer of the multi-layer architecture. The method further includes determining, by the one or more control devices, a power setpoint for the energy generation and storage system at a second layer of the multi-layer architecture. The power or energy setpoint is based, at least in part, on the power or energy generation schedule. The method further includes controlling, by the one or more control devices, operation of the energy generation and storage system based, at least in part, on the power or energy setpoint.

In another aspect, a control system for controlling operation of an energy generation and storage system using a multi-layer architecture is provided. The control system includes one or more control devices configured to perform operations. The operations include determining a power or energy generation schedule at a first layer of the multi-layer architecture. The operations can further include determining a power or energy setpoint for the energy generation and storage system at a second layer of the multi-layer architecture. The power or energy setpoint can be based, at least in part, on the power or energy generation schedule. The operations can further include controlling operation of the energy generation and storage system based, at least in part, on the power or energy setpoint.

In yet another aspect, a multi-layer architecture for controlling operation of an energy generation and storage system is provided. The multi-layer architecture includes a first layer. The first layer includes one or more control devices configured to determine a power or energy generation schedule for the energy generation and storage system. The multi-layer architecture further includes a second layer. The second layer includes one or more control devices configured to determine a power or energy setpoint for the energy generation and storage system based, at least in part, on the power or energy generation schedule. The multi-layer architecture further includes a third layer. The third layer includes one or more control devices configured to control operation of the energy generation and storage system based, at least in part, on the power or energy setpoint.

Variations and modifications can be made to these example aspects of the present disclosure. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION OF THE INVENTION

Figure 1:
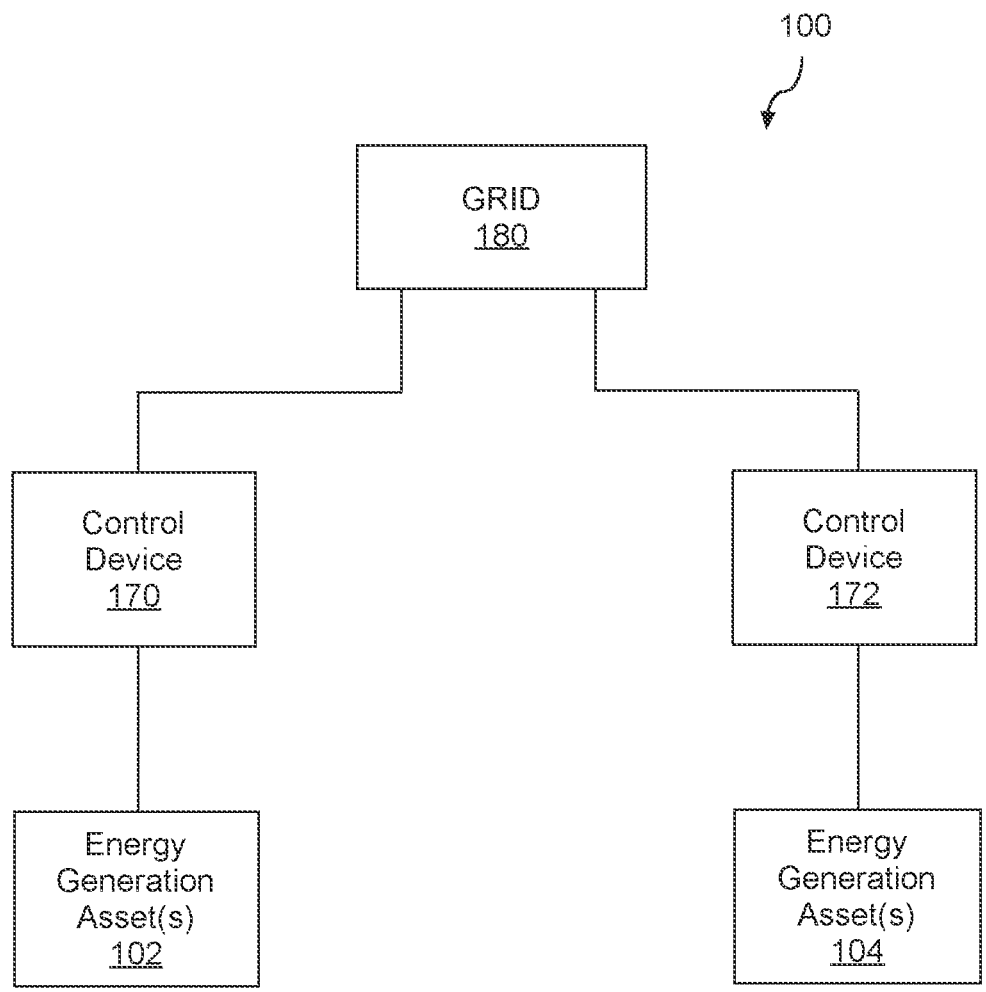
FIG. 1 depicts an energy generation and storage system according to example embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure are directed to systems and methods for controlling operation of an energy generation and storage system using a multi-layer architecture. In some implementations, the multi-layer architecture can include three separate layers (e.g., first layer, second layer, and third layer). The first layer can include a scheduling controller configured to determine a power or energy generation schedule for the energy generation and storage system. The second layer can include a dispatch controller configured to determine a power or energy setpoint for the power generation and storage system based, at least in part, on the power or energy generation schedule. The third layer can include a configuration controller configured to control one or more assets (e.g., energy generation assets and/or energy storage assets) in real time and account for real time constraints, such as those imposed by the grid operator and not visible to the dispatch controller.

The scheduling controller can be configured to determine a power or energy generation schedule that maximizes net revenue (e.g. gross, penalties, cost of system degradation) based on various input data. For instance, the input data can include forecasted or actual market data, forecasted power generation data, environmental data, operational feedback data (e.g., state-of-charge), or any other suitable data that can be used to determine the power or energy generation schedule. The scheduling controller can be configured to determine a power generation schedule that satisfies one or more constraints of a grid or market service to which the energy generation and storage system is committed. For example, the scheduling controller can be configured to determine a power generation schedule that allows the energy generation and storage system to operate in a firm manner despite the unpredictable nature of the energy generation assets (e.g., solar, wind, etc.) of the system. The scheduling controller can also be used to generate a bid in the day or hours ahead timeframe in the energy, capacity or ancillary service markets. For instance, the scheduling controller can be configured to take into account forecasts for day ahead prices and forecasts for wind and solar generation and determine a bid schedule that maximizes revenue in the day ahead energy market. In this instance, the cleared bid from the energy market will be passed on to the dispatch controller as the generation schedule. The scheduling controller can similarly be configured for several use cases including, but not limited to, firming and load following.

The dispatch controller can be configured to determine a power or energy setpoint for the energy generation and storage system that further maximizes the system's net revenue and is based, at least in part, on the power generation schedule determined by the scheduling controller. In some instances, the amount of power or energy the generation assets output during a portion of the power or energy generation schedule can be less than the amount of power or energy required by the grid service request due to inaccuracies in predicting in advanced the amount of power that will be generated during scheduling. In such instances, the power or energy setpoint determined by the dispatch controller can recommend the energy storage assets (e.g., batteries) discharge to provide the additional power or energy needed to meet the power or energy demands of the grid service request. In this manner, deviations between the amount of power or energy the system provides and the amount of power or energy the system is committed to provide according to the power generation schedule can be avoided. More specifically, deviations from the power generation schedule that result in penalties (e.g., monetary losses, energy losses, power losses, etc.) can be avoided.

However, in some instances, the amount of power or energy the generation assets output during a portion of the power or energy generation schedule can be greater than the amount of power or energy required by the grid service request. In such instances, the power or energy setpoint determined by the dispatch controller can recommend the excess power or energy generated by the generation assets be used to charge the storage assets of the system. In this manner, the excess power or energy generated by the generation assets can be used in a more efficient manner. In addition to using the energy storage assets, the power generation assets can also be used to respond to a power setpoint when needed, as determined by the dispatch controller or configured controller. The dispatch controller can also be configured to generate power or energy bids in the real time market. The real time market bids are typically requested a few minutes to a few hours in advance of the actual generation. The dispatch controller can take into account better near term forecasts for energy production and price to determine the real time bid to maximize revenue. In this instance, the cleared bid is passed on to the third layer which is the configuration controller as the power or energy setpoint. The dispatch controller can similarly be configured for several use cases including but not limited to firming and load following.

The configuration controller can be configured to determine whether the power or energy setpoint determined by the dispatch controller violates one or more constraints. In some implementations, the one or more constraints can be associated with the grid regulations. Alternatively or additionally, the one or more constraints can be associated with one or more assets (e.g., energy generation assets and/or energy storage assets) of the system. Furthermore, an external authority (e.g., grid operator), can impose a constraint on the system by commanding it to output a certain power or respond to a grid event (e.g., frequency event).

When the configuration controller determines the power or energy setpoint violates the one or more constraints, the configuration controller does not adjust operation of the energy generation and storage system according to the power or energy setpoint recommended by the dispatch controller at the second layer of the architecture. In contrast, when the configuration controller determines the power or energy setpoint does not violate the one or more constraints, the configuration controller generates one or more control actions associated with controlling operation of the energy generation and storage system based, at least in part, on the power or energy setpoint. More specifically, the one or more control actions can be associated with adjusting the power or energy setpoint for the assets (e.g., energy generation asset and/or energy storage assets) of the energy generation and storage system. In this manner, operation of the energy generation and storage system can be controlled (e.g., adjusted) to avoid deviations in the power generation schedule the system is currently committed to provide. As such, deviations from the power generation schedule that result in penalties (e.g., monetary losses, energy losses, power losses, etc.) can be reduced or eliminated, thus maximizing net revenue of the system. The configuration controller also manages grid code compliance requirements and is authorized to deviate from the power or energy setpoint if such deviation is required to meet grid code compliance requirements.

The present disclosure provides numerous technical benefits. For instance, controlling operation of the energy generation and storage system using the multi-layer architecture allows the system to operate in a more efficient manner and achieve maximum net revenue across its grid service requests while maintaining grid compliance. As mentioned above, the system can be controlled such that the energy storage assets discharge when the amount of power the generation assets output is less than the amount of power required by the grid service request. Thus, deviations from the power generation schedule that result in penalties (e.g., monetary losses, energy losses, power losses, etc.) can be avoided. Additionally, the system can be controlled such that the energy storage assets charge when the amount of power the generation assets output is greater than the amount of power required by the grid service request. In this manner, excess power generated by the generation assets can be recycled. The multi-layer architecture ensures that the scheduling controller can make power and energy commitments days or hours in advance where required by the grid operator. This architecture also allows for the dispatch controller to deviate from this advance commitment based on near term forecasts when the costs or penalties associated with such deviation is lesser than the rewards. The last layer of the multi-layer architecture, the configuration controller, manages the assets in real time and ensures real time constraints and grid compliance requirements are met.

Referring now to the Figures, FIG. 1 depicts an energy generation and storage system 100 according to example embodiments of the present disclosure. The energy generation and storage system 100 includes one or more energy generation assets 102 and one or more energy storage assets 104. In some implementations, the energy generation and storage system 100 can be a standalone power system. In alternative implementations, the energy generation and storage system 100 can be implemented as part of a large-scale renewable energy system, such as wind farm or solar farm.

The energy generation asset(s) 102 can include any number of energy generating components. For example, the energy generation asset(s) 102 can include, without limitation, gas engine generators, gas turbines, wind turbines, solar cells, steam turbines, hydroelectric generators, nuclear power assets, or other devices capable of generating energy.

Figure 2:
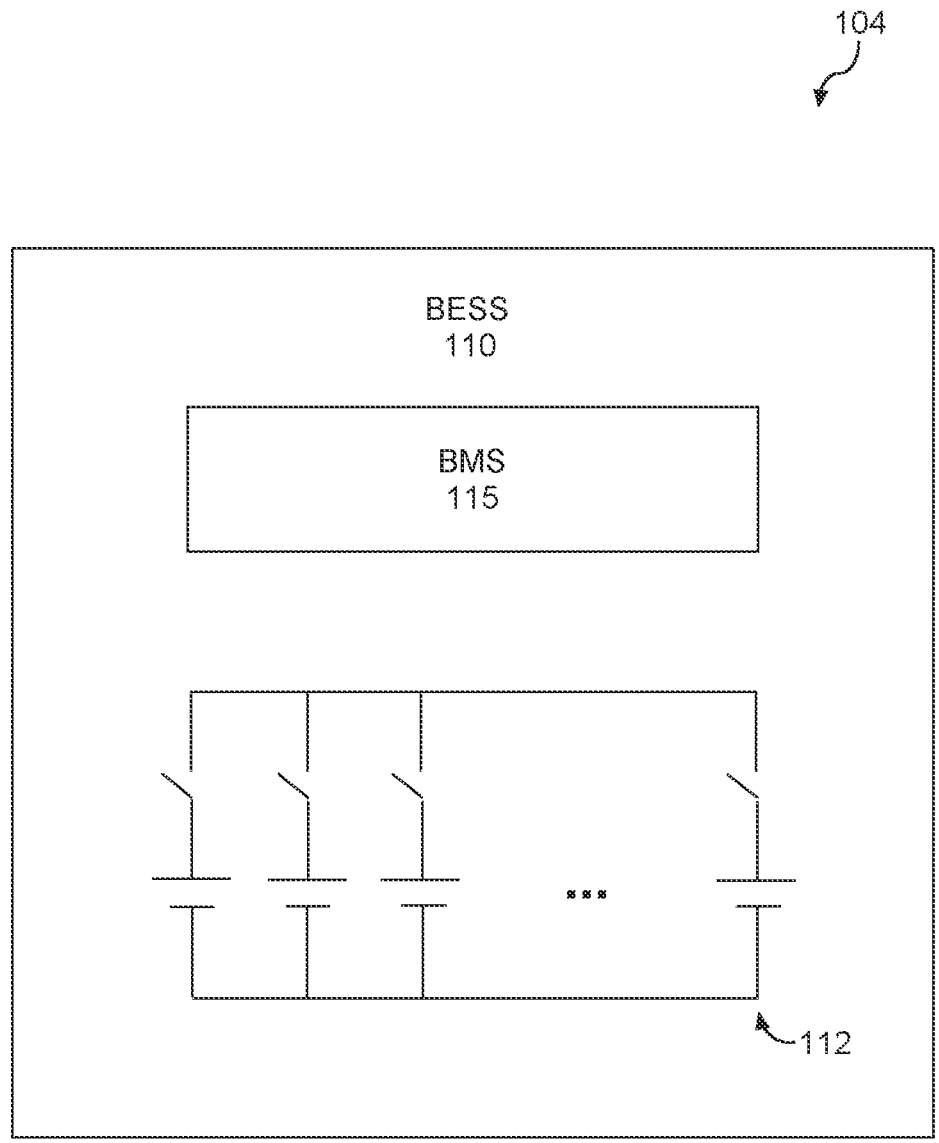
FIG. 2 depicts a block diagram of an energy storage asset of the energy generation and storage system of FIG. 1 according to example embodiments of the present disclosure.

Referring briefly now to FIG. 2, the energy storage asset(s) 104 can include any number of energy storing components. For example, the energy storage asset(s) 104 can include a battery energy storage system (BESS) 110. The BESS 110 can include one or more battery energy storage devices 112, such as battery cells or battery packs. The battery energy storage devices 112 can contain one or more sodium nickel chloride batteries, sodium sulfur batteries, lithium ion batteries, nickel metal hydride batteries, or other similar devices. The battery energy storage units 112 can be coupled to a switching element (e.g. one or more contactors) selectively operable to couple the energy storage units 112 to the system 100. Although battery energy storage units 112 include individual battery cells coupled to a switching element, it will be appreciated that battery energy storage units 112 can include multiple battery cells coupled to the switching element. In addition, the present disclosure is discussed with reference to a battery energy storage system for purposes of illustration and discussion, those of ordinary skill in the art, using the disclosures provided herein, should understand that other energy storage devices (e.g. capacitors, fuel cells, etc.) can be used without deviating from the scope of the present disclosure.

The BESS 110 can include a battery management system (BMS) 115. The BMS 115 can include one or more electronic devices that monitor one or more of the battery energy storage units 112, such as by protecting the battery energy storage unit from operating outside a safe operating mode, monitoring a state of the battery energy storage unit, calculating and reporting operating data for the battery energy storage unit, controlling the battery energy storage unit environment, and/or any other suitable control actions. For example, in some embodiments, the BMS 115 is configured to monitor and/or control operation of one or more energy storage units 112. The BMS 115 can be, for example, a logic controller implemented purely in hardware, a firmware-programmable digital signal processor, or a programmable processor-based software-controlled computer.

Referring again to FIG. 1, the system 100 can also include one or more control devices (e.g., controller) configured to monitor and/or control various aspects of the energy generation and storage system 100. For instance, as shown in FIG. 1, the system 100 can include a first control device 170 configured to control operation of the energy generation asset(s) 102. Additionally, the system 100 can include a second control device 172 configured to control operation of the energy storage asset(s) 104. For instance, the control devices 170, 172 can control an amount of power the energy generation asset(s) 102 and/or energy storage asset(s) 104 provide to a power grid 180.

Figure 3:
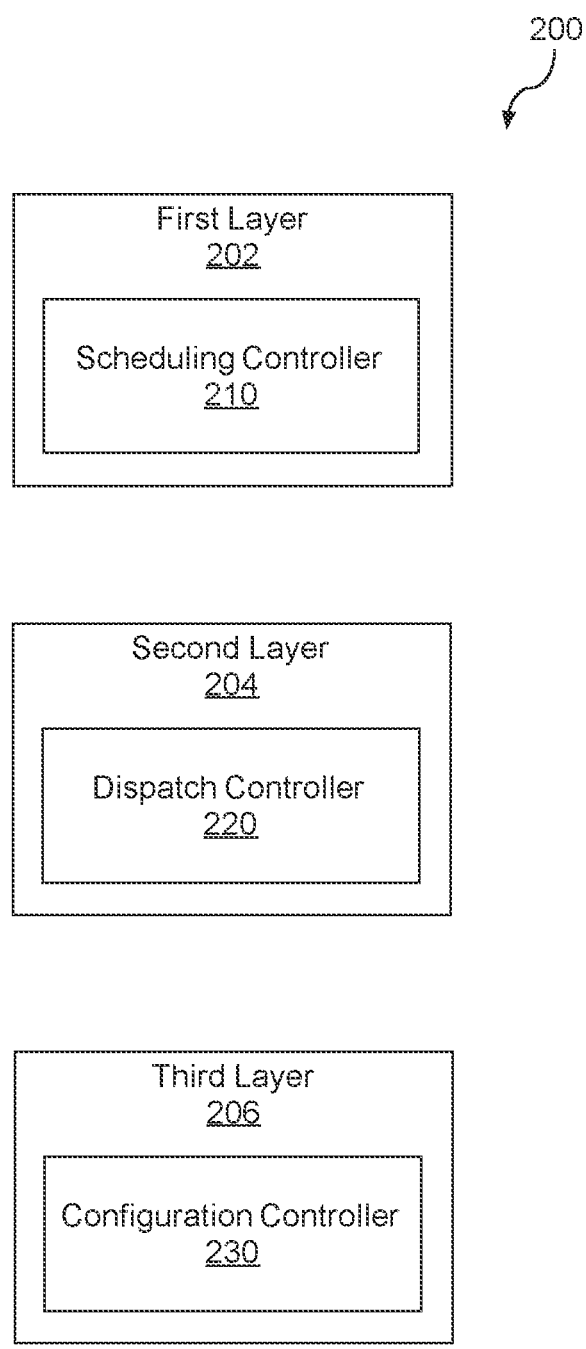
FIG. 3 depicts a multi-layer architecture used to control operation of an energy generation and storage system according to example embodiments of the present disclosure.

Referring now to FIG. 3, a block diagram of a multi-layer architecture 200 that can be used to control operation of an energy generation and storage system is provided according to example embodiments of the present disclosure. As shown, the multi-layer architecture 200 includes a first layer 202, a second layer 204, and a third layer 206. It should be appreciated, however, that the multi-layer architecture can include more or fewer layers. For instance, in some embodiments, the multi-layer architecture 200 can include only two layers.

As shown, the first layer 202 can include a scheduling controller 210, the second layer 204 can include a dispatch controller 220, and the third layer 206 can include a configuration controller 230. It should be appreciated that the controllers 210, 220, 230 of the different layers 202, 204, 206 can be implemented using hardware, software, or combinations of hardware and software. Suitable hardware may include, but is not limited to, a processor, a field programmable gate-array, an application specific integrated circuit (ASIC), digital or analog electrical circuit, packaged hardware units, and the like. Suitable software may include, but is not limited to, a portion of program code that is executable by a processor to perform a particular function or set of functions, a self-contained software component, firmware, and the like. For instance, each layer of the multi-layer architecture 200 can include software configured to be stored in a processor readable storage device to program a processor to perform functions described herein.

Figure 4:
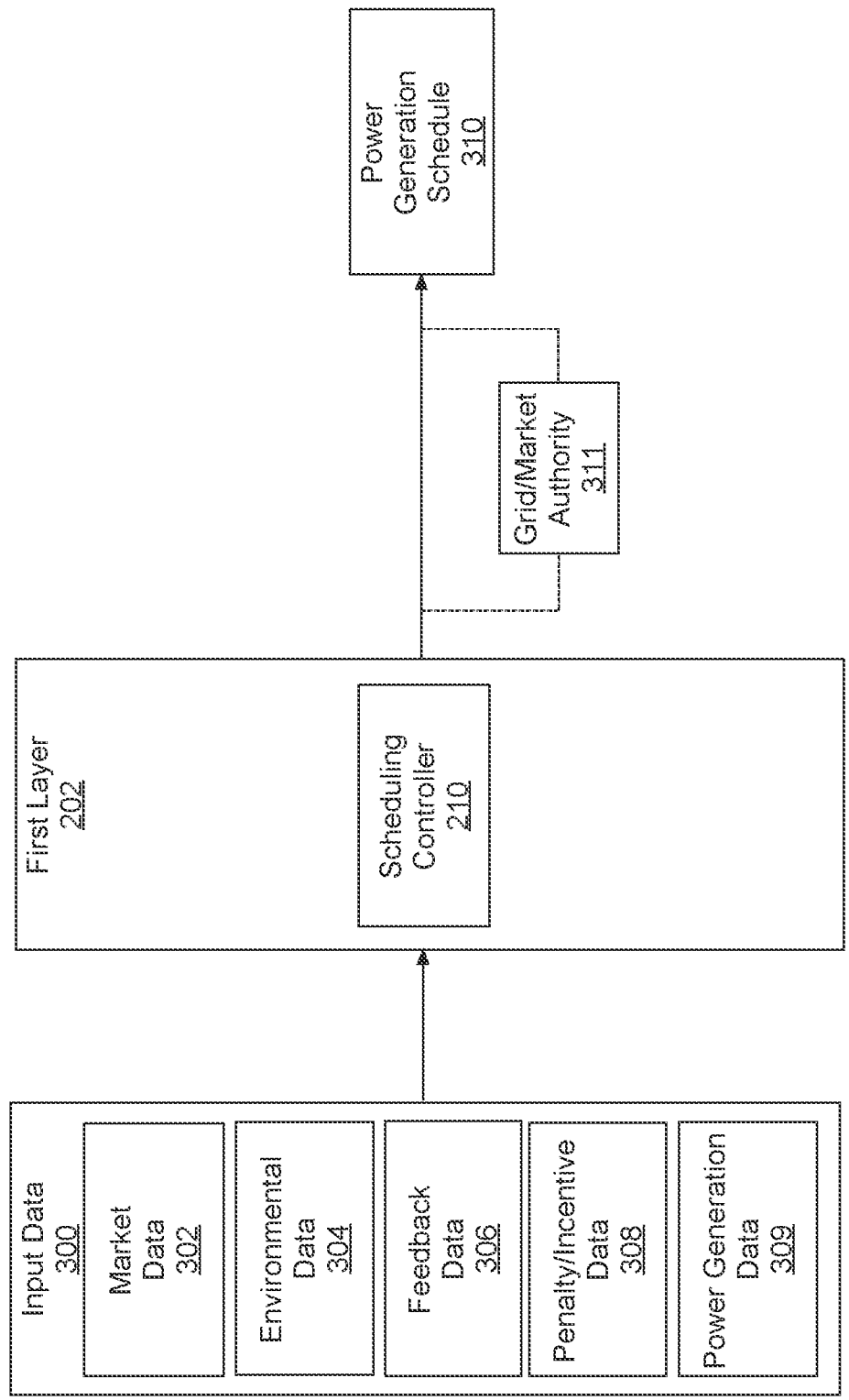
FIG. 4 depicts a scheduling controller of the multi-layer architecture of FIG. 2 according to example embodiments of the present disclosure.

Referring now to FIG. 4, the scheduling controller 210 can be configured to access, obtain, or receive various types of input data 300. For example, the scheduling controller 210 can obtain market data 302 that describes various market inputs. In some implementations, the market data 302 can include data that describes day ahead market prices (e.g., for energy and/or ancillary services), fuel prices, or other prices for various items that may be bought or sold from a market (e.g., an energy market associated with the grid). The market data 302 may include forecasted or actual data. Alternatively or additionally, the market data 302 can include or convey one or more grid service requests.

In some implementations, the scheduling controller 210 can determine one or more grid service requests based on the forecasted or actual market input data 302. The grid service requests can be requests for beneficial services, such as peak shaving, frequency response, ramp rate control, purchasing and selling of energy, load following, energy arbitrage, power firming, and other grid services. The grid service requests can specify a requested amount of power and/or a requested duration. The grid service requests or other associated requests can specify certain performance parameters that are mandatory or requested (e.g., supplied power should be within a certain frequency range). If the supplied grid service does not meet the performance parameters, the potential revenue can be decreased by some factor.

In some implementations, the input data 300 includes environmental data 304 that describes various environmental conditions. For instance, the environmental input data 304 can include data that describes an ambient temperature at one or more of the energy generation and/or storage assets, an ambient humidity at one or more of the energy generation and/or storage assets, an ambient pressure at one or more of the energy generation and/or storage assets, weather forecasts for locations of one or more of the energy generation and/or storage assets, hazardous conditions potentially damaging to assets or preventative of maintenance thereto, or other environmental conditions.

In some implementations, the input data 300 can include system operational feedback data 306 indicative of performance of one or more assets (e.g., energy generating assets and/or energy storage assets) of the energy generation and storage system. For example, the feedback data 306 can indicate state of asset data (e.g., presently observed physical measurements) that describes the status of various operational parameters or other current conditions of the one or more assets of the energy generation and storage system.

As an example, one or more sensors of the energy generation and storage system can provide state of asset data to the scheduling controller 210. For instance, the state of asset data can describe a current power output setpoint of one or more energy generation assets; a current effective power output by the generation asset(s); a current state of health of the energy generation asset(s); and/or a current RPM for one or more energy generation assets that include moving parts. Alternatively or additionally, the state of asset data can include one or more temperature readings associated with the energy generation asset(s); an emissions status for the energy generation asset(s); a current and/or expected efficiency for the energy generation asset(s); or any other suitable data indicative of a state or health of the energy generation asset(s).

As another example, the state of asset data obtained from the one or more sensors can describe a current power output setpoint of one or more energy storage assets; a current effective power output by the energy storage asset(s); a current state of health of the energy storage asset(s); and/or a current state of charge of the energy storage asset(s). Alternatively or additionally, the state of asset data can include one or more temperature readings associated with the energy storage asset(s).

In some implementations, the input data 300 can include penalty/incentive data 308. For instance, the data 308 can be indicative of a penalty (e.g., monetary losses, energy losses, power losses, etc.) associated with non-compliance of one or more constraints of a grid services request. Alternatively or additionally, the data 308 can be indicative of an incentive (e.g., monetary) associated with compliance of the one or more constraints of the grid service request.

In some implementations, the input data 300 can include forecast power generation data 309 associated with the energy generation asset(s) 102 (FIG. 1) of the system 100 (FIG. 1). For instance, the forecast power generation data 309 can indicate an amount of power the energy generation asset(s) 102 is predicted to generate over the next day. It should be appreciated, however, that the power generation data 309 can indicate an amount of power the energy generation asset(s) 102 are predicted (e.g., forecasted) to generate over any suitable amount of time.

In some implementations, the scheduling controller 210 can determine a power or energy generation schedule 310 to commit to the grid authority based, at least in part, on the input data 300. For instance, the scheduling controller 210 can be configured to determine a power generation schedule 310 that satisfies one or more constraints of a grid services request. In this manner, economic losses (e.g., lost revenue) associated with operating the energy generation and storage system to meet the grid services request can be reduced or eliminated.

In some implementations, the scheduling controller 210 can be configured to determine the power or energy generation schedule 310 multiple times each day. For example, the scheduling controller 210 can be configured to determine the power generation schedule 310 after a predetermined amount of time (e.g., 1 hour) has lapsed since the power generation schedule 310 was last determined. In this manner, the power generation schedule 310 can be updated to reflect fluctuations (e.g., changes) to the input data 300. In some implementations, the power generation schedule 310 determined by the scheduling controller 210 can be provided to a grid operator/market authority 311 for approval. Furthermore, upon receiving approval, the power generation schedule 310 can be provided to the second layer 204 of the multi-layer architecture, which will be discussed below in more detail.

Figure 5:
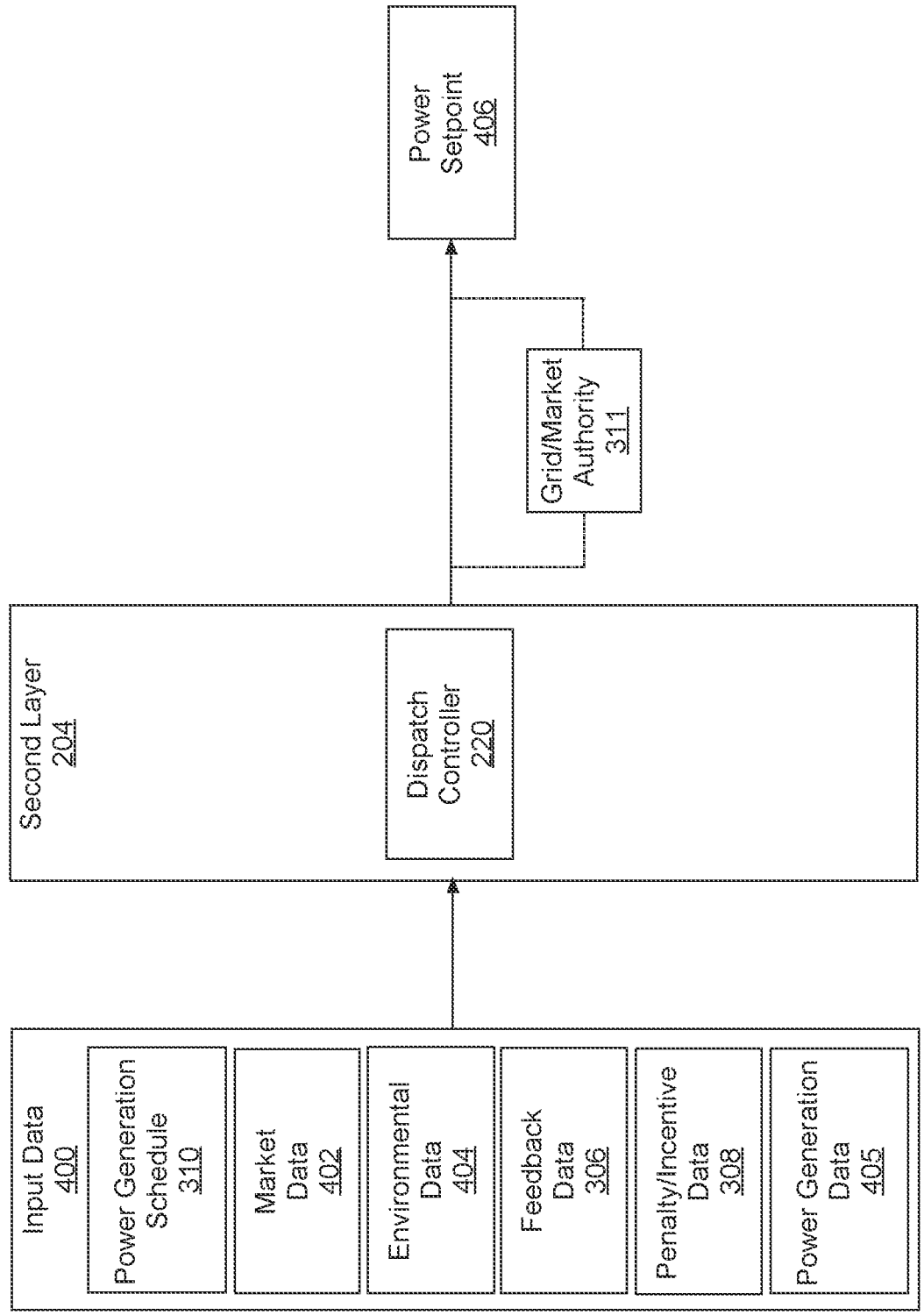
FIG. 5 depicts a dispatch controller of the multi-layer architecture of FIG. 2 according to example embodiments of the present disclosure.

Referring now to FIG. 5, the dispatch controller 220 included at the second layer 204 of the multi-layer architecture 200 can be configured to access, obtain, or receive various types of input data 400. For example, the input data 400 can include data associated with the power generation schedule 310 determined by the scheduling controller 210 (FIG. 3) at the first layer 202 (FIG. 3) of the multi-layer architecture 200. For instance, the data associated with the power generation schedule 310 can indicate an amount of power the system is committed to provide over a predetermined amount of time, such as one hour.

In some implementations, the input data 400 can include forecasted or actual market input data 402 that describes real-time market prices (e.g., for energy and/or ancillary services) for various items that may be bought or sold from a market, such as an energy market associated with the grid. Alternatively or additionally, the input data 400 can include environmental data 404 that includes real-time weather forecast data for an area or region in which the energy generation and storage system is located.

In some implementations, the input data 400 can include the feedback data 306 indicative of performance of the energy generation asset(s) 102 (FIG. 1) and/or the energy storage assets(s) 104 (FIG. 1). For example, the feedback data 306 can indicate state of asset data (e.g., presently observed physical measurements) that describes the status of various operational parameters or other current conditions at the energy generation asset(s) 102 and/or the energy storage asset(s) 104.

In some implementations, the input data 400 can include forecast power generation data 405 associated with the energy generation asset(s) 102 (FIG. 1) of the system 100 (FIG. 1). For instance, the forecast power generation data 405 can indicate an amount of power the energy generation asset(s) 102 is predicted to generate over the next few hours. It should be appreciated, however, that the power generation data 405 included as input data 400 for the dispatch controller 220 can be more accurate compared to the power generation data 309 (FIG. 4) included as input data 300 (FIG. 4) for the scheduling controller 210 (FIG. 4).

The dispatch controller 220 can be configured to determine a power or energy setpoint for one or more assets (e.g., energy generation assets and/or energy storage assets) of the energy generation and storage system. In some implementations, the power setpoint can include a split value indicative of a power split between an energy generation asset (e.g., wind, solar, etc.) of the system and an energy storage asset (e.g., battery) of the system. It should be appreciated that the power or energy setpoint for a particular asset (e.g. generation asset or storage asset) can be positive or negative. A positive power setpoint for an asset indicates the asset is providing power to the load (e.g., grid) or other components of the system. In contrast, a negative power setpoint for an asset indicates the asset is receiving power (e.g., charging) from the load (e.g., grid) or other components of the system.

Figure 6:
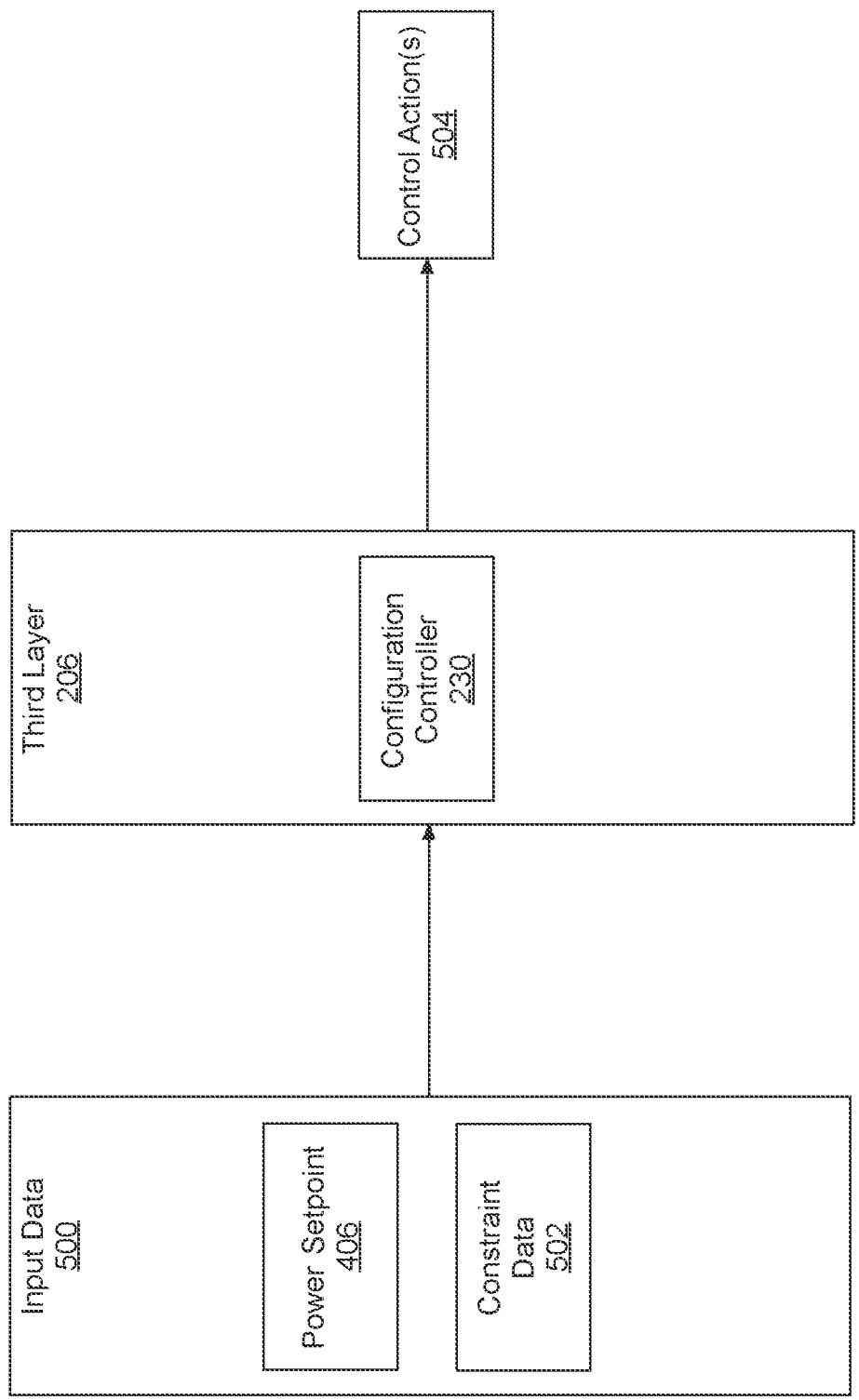
FIG. 6 depicts a configuration controller of the multi-layer architecture of FIG. 2 according to example embodiments of the present disclosure.

In some implementations, the power or energy setpoint 406 determined by the dispatch controller 220 can be provided to the grid operator/market authority 311 for approval. Furthermore, upon receiving approval, the power or energy setpoint 406 can be provided to the third layer 206 (FIG. 3) of the multi-layer architecture 200 (FIG. 3), which will be discussed below in more detail Referring now to FIG. 6, the configuration controller 230 can be configured to access, obtain, or receive various types of input data 500. For example, the input data 500 can include the power setpoint 406 determined by the dispatch controller 220 (FIG. 5) at the second layer 204 of the multi-layer architecture 200. Additionally, the input data 500 can include constraint data 502 provided by a grid operator or other external source. In some implementations, the constraint data 502 can be indicative of one or more constraints associated with the grid service request to which the energy generation and storage system is currently committed. Alternatively or additionally, the constraint data 502 can be indicative of one or more constraints associated with one or more assets (e.g., energy generation asset and/or energy storage assets) of the system.

The configuration controller 230 can be configured to determine whether the power setpoint 406 recommended by the dispatch controller 220 (FIG. 5) at the second layer 204 (FIG. 5) violates the one or more constraints. When the configuration controller 230 determines the power setpoint 406 violates the one or more constraints, the configuration controller 230 does not adjust operation of the energy generation and storage system according to the power setpoint 406. In contrast, when the configuration controller 230 determines the power setpoint 406 does not violate the one or more constraints, the configuration controller 230 generates one or more control actions 504 associated with controlling operation of the energy generation and storage system based, at least in part, on the power or energy setpoint 406. More specifically, the one or more control actions 504 can be associated with adjusting the power or energy setpoint for the assets (e.g., energy generation asset and/or energy storage assets) of the energy generation and storage system. In this manner, operation of the energy generation and storage system can be controlled (e.g., adjusted) to avoid deviations between the amount of power or energy the system outputs and the amount of power the system is committed to provide according to the power generation schedule. More specifically, deviations from the power generation schedule resulting in penalties (e.g., monetary loss, energy loss, power loss, etc.) can be reduced or eliminated.

Figure 7:
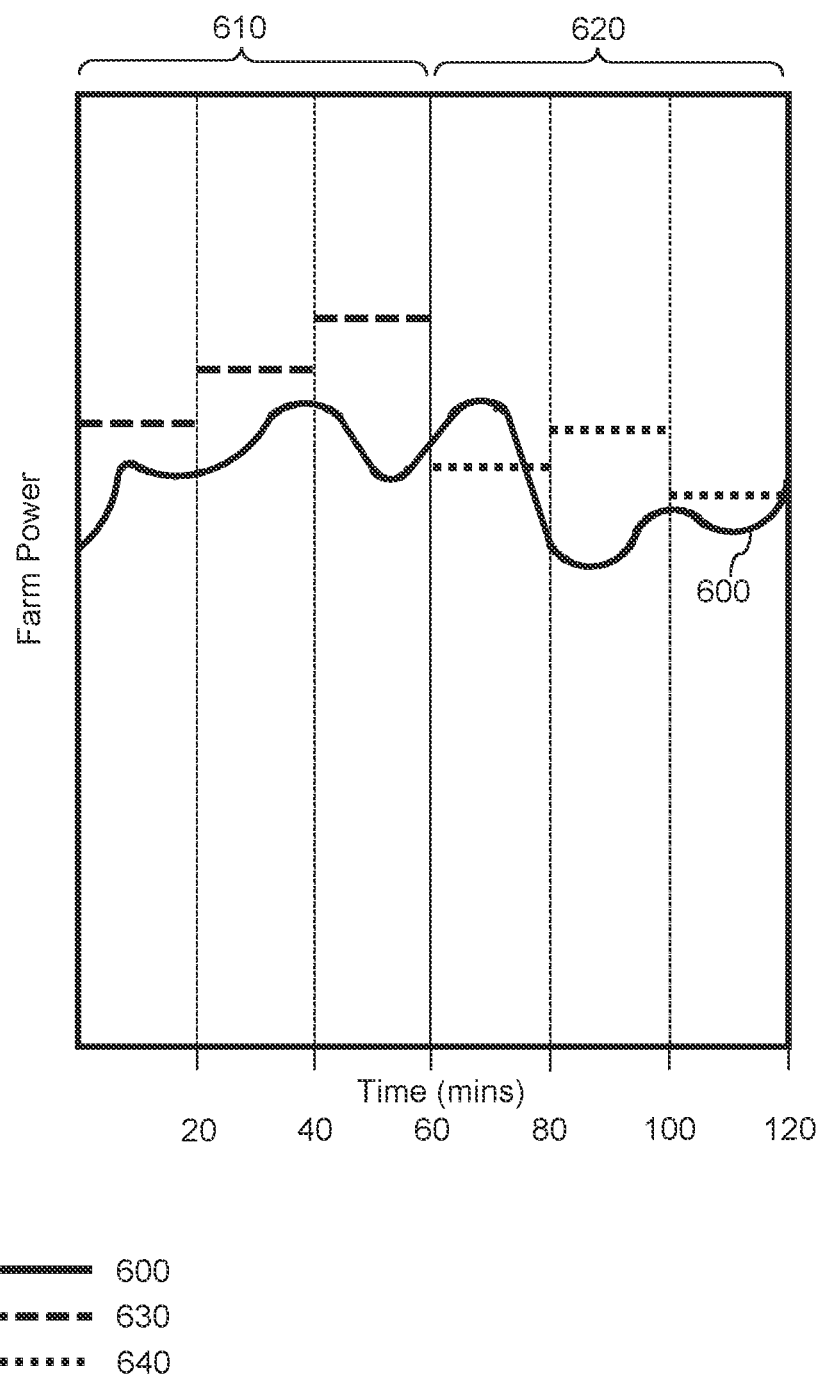
FIG. 7 depicts a graphical representation of implementation of the multi-layer architecture of FIG. 3 according to example embodiments of the present disclosure.

Referring now to FIG. 7, a graphical representation of an implementation of the multi-layer architecture 200 (FIG. 3) for a power generation and storage system committed to a grid service (e.g., power firming) according to example embodiments of the present disclosure. Curve 600 indicates a forecasted output of the energy generation asset(s) 102 (FIG. 1) of the power generation and storage system 100. As shown, the graphical representation depicts a first interval of time 610 and a second interval of time 620 that occurs after the first interval of time 610. The first interval of time 610 and the second time interval 620 each span one hour. However, it should be appreciated, that the first and second time intervals 610, 620 can span any suitable amount of time.

Line 630 corresponds to the power generation schedule the energy generation and storage system is, according to the power generation schedule 310 (FIG. 4), committed to provide during the first interval of time 610. As shown, the energy generation and storage system is committed to provide a greater amount of power than the energy generation asset(s) 102 of the system 100 are forecasted to provide during the first interval of time 610. Thus, in order to ensure an amount of power or energy the system output does not deviate (e.g., vertical space between curve 600 and line 630) from an amount of power the system is committed to provide according to the power generation schedule, the dispatch controller 220 (FIG. 5) implemented at the second layer 204 (FIG. 5) of the multi-layer architecture 200 can determine a power or energy setpoint for the system 100 (FIG. 1). More specifically, the dispatch controller 220 can determine a power or energy setpoint for the system 100 such that the energy storage asset(s) 104 of the system 100 provides an additional amount of power that is needed to ensure the energy generation and storage system 100 (that is, the energy generation asset(s) 102 and the energy storage asset(s) 104) provides the requisite amount of power according to the power generation schedule.

Line 640 corresponds to a predicted power generation schedule (e.g., not yet committed to grid authority) for the energy generation and storage system during the second interval of time 620. As shown, the predicted power generation schedule is less than the forecasted output of the energy generation asset(s) 102 (FIG. 1) of the system 100. As such, the dispatch controller 220 can determine a power or energy setpoint for the system 100 such that excess power generated by the generation asset(s) 102 can be used to recharge the energy storage asset(s) 104. In this manner, the multi-layer architecture 200 of the present disclosure reduces or eliminates the occurrence of penalties (e.g., monetary losses, energy losses, power losses, etc.) associated with operation of the energy generation and storage system.

Figure 8:
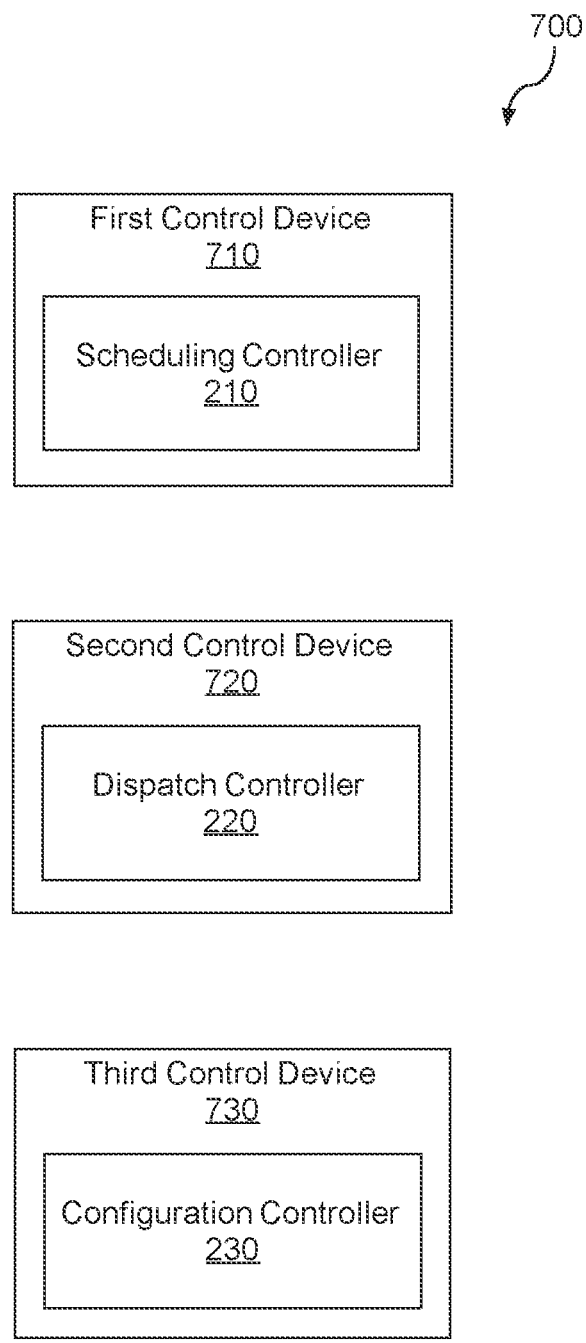
FIG. 8 depicts a system for controlling operation of an energy generation and storage system according to example embodiments of the present disclosure.

Referring now to FIG. 8, a system 700 for controlling operation of an energy generation and storage system using a multi-layer architecture (e.g., multi-layer architecture of FIGS. 3-6) is provided according to example embodiments of the present disclosure. As shown, the system 700 can include a first control device 710 configured to implement the first layer 202 (FIG. 4) of the multi-layer architecture 200. For instance, the first control device 710 can be configured to implement the scheduling controller 210 included in the first layer 202. In this manner, the first control device 710 can access or obtain input data (e.g., market data, environmental data, feedback data, penalty/incentive data) that can be used to determine a power or energy generation schedule for the energy generation and storage system.

In some implementations, the system 700 can include a second control device 720 configured to implement the second layer 204 (FIG. 5) of the multi-layer architecture 200. For instance, the second control device 720 can be configured to implement the dispatch controller 220 included in the second layer 204. In this manner, the second control device 720 can access or obtain input data (e.g., power generation schedule, market data, environmental data, feedback data, penalty/incentive data, etc.) that can be used to determine a power or energy setpoint for the energy generation and storage system. More specifically, the second control device can be configured to determine a power setpoint for one or more assets (e.g., generation asset and/or storage asset) to reduce or eliminate deviations from the power or energy generation schedule that can result in penalties (e.g. monetary losses, energy losses, power losses, etc.).

In some implementations, the system 700 can include a third control device 730 configured to implement the third layer 206 (FIG. 6) of the multi-layer architecture 200. For instance, the third control device 730 can be configured to implement the configuration controller 230 included in the third layer 206. In this manner, the third control device 730 can be configured to determine whether the power or energy setpoint determined by the second control device 720 violates one or more constraints. In some implementations, the one or more constraints can be associated with the grid service request to which the energy generation and storage system is committed. Alternatively or additionally, the one or more constraints can be operating constraints (e.g., rated voltage) of one or more assets of the energy generation and storage system.

In some implementations, the control devices 710, 720, 730 of the system 700 can be configured to implement the respective layers 202, 204, 206 (FIG. 3) of the multi-layer architecture 200 at different frequencies. For instance, the first control device 710 can be configured to implement the scheduling controller 210 at a first frequency (e.g., once every hour).

The second control device 720 can be configured to implement the dispatch controller 220 at a second frequency that is different than the first frequency. More specifically, the second frequency can be greater than the first frequency. In this manner, the second control device 720 can be configured to implement the dispatch controller 220 more frequently than the first control device 710 implements the scheduling controller 210.

The third control device 730 can be configured to implement the configuration controller 230 at a third frequency that is different than the first frequency. More specifically, the third frequency can be greater than the second frequency. In this manner, the third control device 730 can be configured to implement the configuration controller 230 more frequently than the second control device 720 implements the dispatch controller 220.

Although the system 700 of FIG. 7 depicts each layer 202, 204, 206 (FIG. 3) of the multi-layer architecture 200 being implemented in discrete control devices, it should be appreciated that one or more layers 202, 204, 206 can be implemented on the same control device. For instance, in some implementations, the second control device 720 can be configured to implement both the second layer 204 and the third layer 206 of the multi-layer architecture 200. It should also be appreciated that the control devices 710, 720, 730 of the system 700 can be located at any suitable location. For instance, in some implementations, the first control device 710 can be a server or cloud computing device provided at a location that is remote relative to the energy generation asset(s) and energy storage asset(s) of the system. In some implementations, the second control device 720 can be configured to facilitate communication between the first control device 710 and the third device 730. Alternatively or additionally, the third control device 730 correspond to the control devices 170, 172 (FIG. 1) of the energy generation and storage system 100 (FIG. 1).

Figure 9:
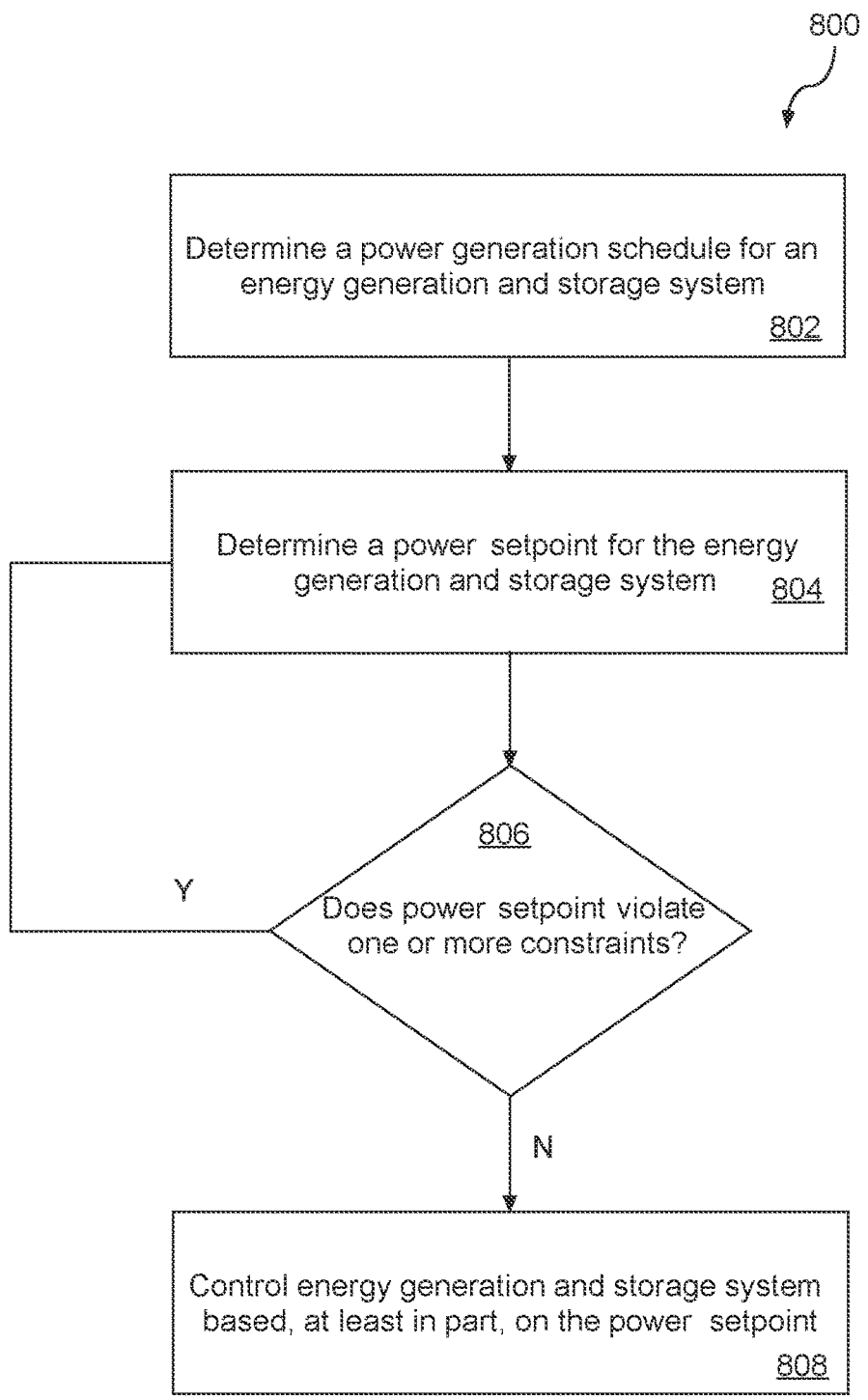
FIG. 9 depicts a flow diagram of a method for controlling operation of an energy generation and storage system according to example embodiments of the present disclosure.

FIG. 9 depicts a flow diagram of a method 800 for controlling operation of an energy generation and storage system using a multi-layer architecture is provided according to example embodiments of the present disclosure. It should be appreciated that the method 800 can be implemented using the multi-layer architecture 200 discussed above with reference to FIGS. 3-6. FIG. 9 depicts steps performed in a particular order for purposes of illustration and discussion. Those of ordinary skill in the art, using the disclosures provided herein, will understand that various steps of the method 800 may be adapted, modified, rearranged, performed simultaneously or modified in various ways without deviating from the scope of the present disclosure.

At (802), the method 800 includes determining, by one or more control devices, a power or energy generation schedule for the energy generation and storage system at a first layer of the multi-layer architecture. In example embodiments, a scheduling controller implemented at a first layer can determine the power or energy generation schedule based on various input data. For instance, the input data can include market data, environmental data (e.g., weather), feedback data indicative of a current state or health of one or more assets of the energy generation and storage system, and/or penalty/incentive data associated with one or more grid service requests. It should be appreciated, however, that the input data can include any data that can be used to determine the power generation schedule for the energy generation and storage system.

At (804), the method 800 includes determining, by one or more control devices, a power or energy setpoint for the energy generation and storage system based, at least in part, on the power or energy generation schedule determined at (802). In example embodiments, a dispatch controller implemented at a second layer of the multi-layer architecture can determine the power setpoint based on various input data. For instance, the input data can include the power generation schedule determined at (802), real-time market data, real-time environmental data (e.g., weather), feedback data indicative of a current state or health of one or more assets of the energy generation and storage system, and/or penalty/incentive data associated with one or more grid service requests. It should be appreciated, however, that the input data can include any data that can be used to determine the power or energy generation schedule for the energy generation and storage system.

At (806), the method 800 includes determining whether the power or energy setpoint determined at (804) violates one or more constraints. In example embodiments, a configuration controller implemented at a third layer of the multi-layer architecture can determine whether the power setpoint determined at (804) violates the one or more constraints.

In some implementations, the one or more constraints can be associated with the one or more assets of the energy generation and storage system. For instance, the one or more constraints can be indicative of operating limits (e.g., rated voltage, rated current, etc.) associated with the one or more assets. Alternatively or additionally, the one or more constraints can be associated with the grid services (e.g., power firming) the energy generation and storage system is currently committed to provide. If the power or energy setpoint determined at (804) does not violate the one or more constraints, the method 800 proceeds to (808). Otherwise, the method 800 reverts to (804). It should be appreciated that multiple iterations of steps (804) and (806) may be performed until a power or energy setpoint is determined that does not violate the one or more constraints. In some implementations, the method 800 can include providing a notification indicative of the power or energy setpoint determined at (804) violating the one or more constraints. In example embodiments, the notification can comprise a visual notification or audible notification. In this manner, one or more persons receiving the notification can become apprised of the power setpoint violation.

At (808), the method 800 includes controlling, by one or more control devices, operation of energy storage system based, at least in part, on the power or energy setpoint. In some implementations, the configuration controller implemented at the third layer of the multi-layer architecture can be configured to generate one or more control actions associated with adjusting operation of one or more assets of the system based, at least in part, on the power or energy setpoint. In this manner, operation of the one or more assets of the system can be adjusted to reduce or eliminate deviations from the power or energy generation schedule that result in penalties (e.g., monetary losses, energy losses, power losses, etc.).

Figure 10:
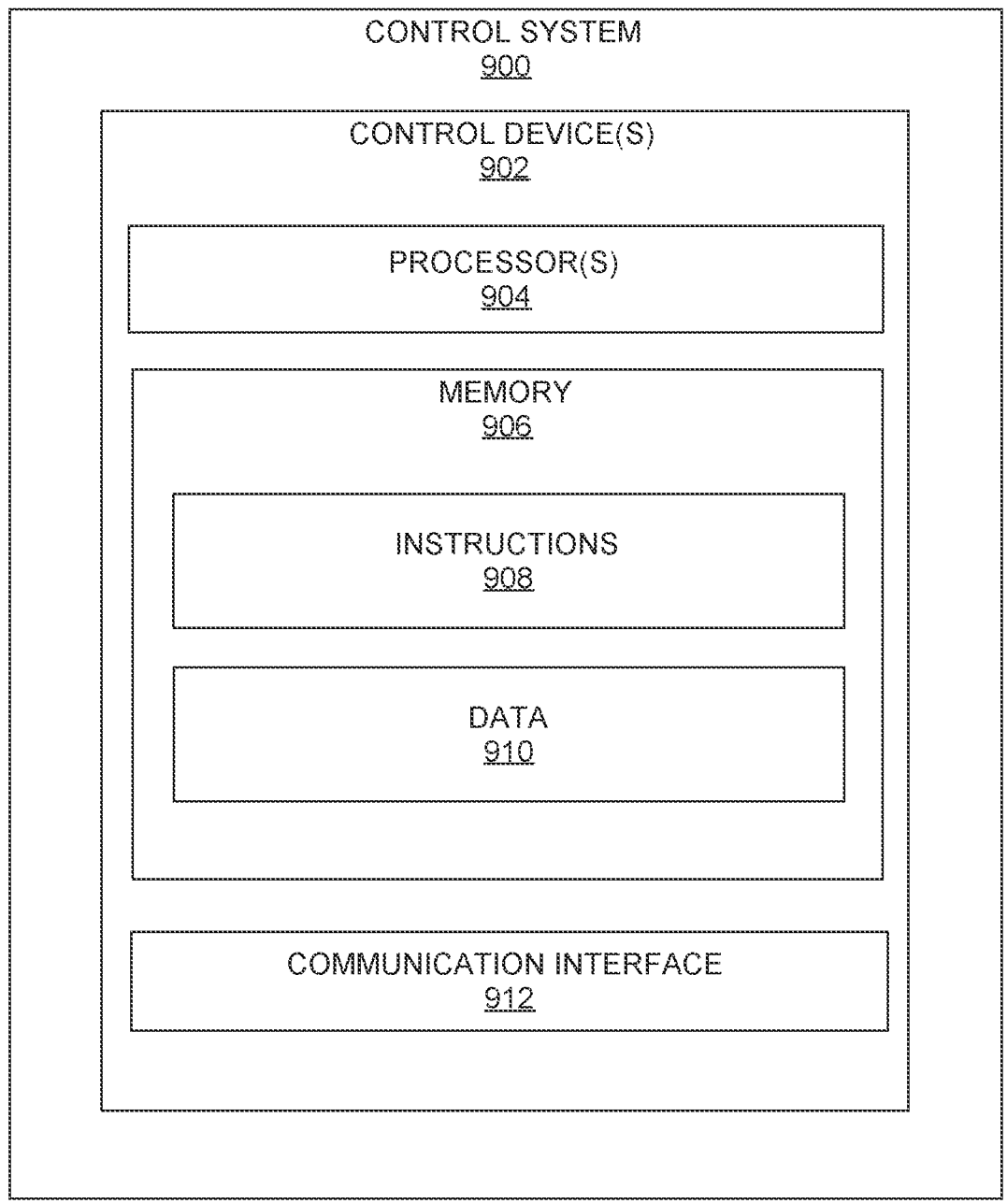
FIG. 10 depicts a block diagram of a control system according to example embodiments of the present disclosure.

FIG. 10 depicts a block diagram of an example control system 900 that may be used by a distributed control system, or other systems to implement methods and systems according to example embodiments of the present disclosure. As shown, the control system 900 can include one or more control device(s) 902. The control device(s) 902 may include one or more processors 904 and one or more memory devices 906. The processor(s) 904 can include any suitable processing device, such as a microprocessor, microcontroller, integrated circuit, logic device, or other suitable processing device. The memory device(s) 906 can include one or more computer-readable media, including, but not limited to, non-transitory computer-readable media, RAM, ROM, hard drives, flash drives, or other memory devices.

The memory device(s) 906 can store information accessible by the one or more processor(s) 904, including computer-readable instructions 908 that may be executed by the processor(s) 904. The instructions 908 may be any set of instructions that when executed by the processor(s) 904, cause the processor(s) 904 to perform operations. The instructions 908 may be software written in any suitable programming language or may be implemented in hardware. In some embodiments, the instructions 908 may be executed by the processor(s) 904 to cause the processor(s) 904 to perform operations, such as implementing one or more of the processes mentioned above. The memory device(s) 904 may further store data 910 that may be accessed by the processor(s) 904. It should be appreciated that data 610 may include one or more table(s), function(s), algorithm(s), model(s), equation(s), etc. according to example embodiments of the present disclosure.

The control device(s) 902 can also include a communication interface 912 used to communicate, for example, with the other components of system 900. The communication interface 912 may include any suitable components for interfacing with one or more network(s), including for example, transmitters, receivers, ports, controllers, antennas, or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein may be implemented using a single computing device or multiple computing devices working in combination. Databases, memory, instructions, and applications may be implemented on a single system or distributed across multiple systems. Distributed components may operate sequentially or in parallel.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the claimed subject matter, including the best mode, and also to enable any person skilled in the art to practice the claimed subject matter, including making and using any devices or systems and performing any incorporated methods. The patentable scope of the disclosed technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling an energy generation and storage system, the method comprising:
   determining, by one or more control devices at a first frequency, a power or energy generation schedule for the energy generation and storage system at a first layer of a multi-layer architecture;
   determining, by the one or more control devices at a second frequency greater than the first frequency, a power or energy setpoint for the energy generation and storage system at a second layer of the multi-layer architecture, the power or energy setpoint based, at least in part, on power or energy generation schedule; and controlling, by the one or more control devices at a third frequency greater than the second frequency, the energy generation and storage system at a third layer of the multi-layer architecture, the controlling comprising:
  determining, at the third layer, whether operating the energy generation and storage system based, at least in part, on the power or energy setpoint from the second layer violates one or more constraints of the energy generation and storage system; and
  responsive to determining whether operating the energy generation and storage system based, at least in part, on the power or energy setpoint from the second layer violates the one or more constraints, adjusting, at the third layer, operation of the energy generation and storage system to operate at a different power or energy setpoint that does not violate the one or more constraints.

2. The method of claim 1, wherein when a total amount of power or energy generated by energy generation assets of the system is less than an amount of power or energy needed to satisfy a grid service associated with the power or energy generation schedule, controlling the energy generation and storage system comprises generating, by the one or more control devices, a control action associated with discharging one or more energy storage assets of the system.

3. The method of claim 1, wherein when a total amount of power or energy generated by energy generation assets of the system is greater than an amount of power or energy needed to satisfy a grid service request associated with the power or energy generation schedule, controlling the energy generation and storage system comprises generating, by the one or more control devices, a control action associated with charging one or more energy storage assets of the system.

4. The method of claim 1, further comprising providing, by the one or more control devices, a notification indicative of the power or energy setpoint violating the one or more constraints of the energy generation and storage system.

5. The method of claim 1, wherein the power or energy setpoint comprises a split value indicative of a power or energy split between one or more energy generation assets of the energy generation and storage system and one or more energy storage assets of the energy generation and storage system.

6. The method of claim 5, wherein the one or more energy generation assets comprise at least one of a wind turbine and a solar panel, and wherein the one or more energy storage assets comprise one or more batteries.

7. The method of claim 1, wherein determining a power generation schedule at a first layer of the multi-layer architecture comprises determining, by the one or more control devices, the power generation schedule based, at least in part, on forecast energy market data and forecast environmental data.

8. The method of claim 1, wherein determining a power or energy setpoint at a second layer of the multi-layer architecture comprises determining, by one or more control devices, the power or energy setpoint such that an amount of power or energy the energy generation and storage system outputs does not deviate from an amount of power or energy the system is committed to provide according to the power or energy generation schedule.

9. The method of claim 8, wherein the power or energy setpoint is determined based, at least in part, on forecast energy market data and forecast environmental data.

10. A system for controlling operation of an energy generation and storage system, the system comprising:
  one or more control devices configured to perform operations, comprising:
    determining, at a first frequency, a power or energy generation schedule for the energy generation and storage system at a first layer of a multi-layer architecture;
    determining, at a second frequency greater than the first frequency, a power or energy setpoint for the energy generation and storage system at a second layer of the multi-layer architecture, the power or energy setpoint based, at least in part, on the power or energy generation schedule; and
    controlling, at a third frequency greater than the second frequency, the energy generation and storage system at a third layer of the multi-layer architecture, the controlling comprising:
      determining, at the third layer, whether operating the energy generation and storage system based, at least in part, on the power or energy setpoint from the second layer violates one or more constraints of the energy generation and storage system; and
      responsive to determining whether operating the energy generation and storage system based, at least in part, on the power or energy setpoint from the second layer violates the one or more constraints, adjusting, at the third layer, operation of the energy generation and storage system to operate at a different power or energy setpoint that does not violate the one or more constraints.

11. The system of claim 10, wherein the operations further comprise:
  providing, by the one or more control devices, a notification indicative of the power or energy setpoint violating the one or more constraints of the energy generation and storage system.

12. The system of claim 10, wherein the power or energy setpoint comprises a split value indicative of a power or energy split between one or more energy generation assets of the energy generation and storage system and one or more energy storage assets of the energy generation and storage system.

13. A multi-layer architecture for controlling operation of an energy generation and storage system, comprising:
  a first layer comprising one or more control devices configured to determine, at a first frequency, a power or energy generation schedule for the energy generation and storage system;
  a second layer comprising one or more control devices configured to determine, at a second frequency greater than the first frequency, a power or energy setpoint for the energy generation and storage system based, at least in part, on the power or energy generation schedule; and
  a third layer comprising one or more control devices configured to control, at a third frequency greater than the second frequency, the energy generation and storage system, wherein controlling comprises determining whether the power or energy setpoint violates one or more constraints of the energy generation and storage system, and, responsive to determining whether operating the energy generation and storage system based, at least in part, on the power or energy setpoint from the second layer violates the one or more constraints, adjust operation of the energy generation and storage system to operate at a different power or energy setpoint that does not violate the one or more constraints.

* * * * *